United States Patent [19]

Hisatake

[11] Patent Number: 5,220,440
[45] Date of Patent: Jun. 15, 1993

[54] DATA COMPRESSION METHOD HAVING A FIXED RATIO OF COMPRESSION FOR IMAGE DATA, AND IMAGE DATA COMPRESSION DEVICE

[75] Inventor: Masayuki Hisatake, Kanagawa, Japan

[73] Assignee: Fuji Xerox Co., Ltd., Tokyo, Japan

[21] Appl. No.: 595,882

[22] Filed: Oct. 10, 1990

[51] Int. Cl.$^5$ ............................................. A63F 9/00
[52] U.S. Cl. ................................... 358/433; 358/429
[58] Field of Search ....................... 358/433, 429–430, 358/261.1–261.3, 133; 382/56

[56] References Cited

U.S. PATENT DOCUMENTS

| | | | |
|---|---|---|---|
| 4,205,341 | 3/1980 | Mitsuya et al. | 358/433 |
| 4,222,076 | 9/1980 | Knowlton | 358/429 |
| 4,811,239 | 3/1989 | Tsao | 358/429 |
| 4,831,659 | 5/1989 | Miyaoka et al. | 358/433 |
| 4,922,349 | 5/1990 | Abe et al. | 358/433 |
| 4,979,738 | 12/1990 | Frederiksen | 340/701 |
| 5,021,891 | 6/1991 | Lee | 358/433 |

FOREIGN PATENT DOCUMENTS 69505 6/1981 Japan .

*Primary Examiner*—Stephen Brinich
*Attorney, Agent, or Firm*—Finnegan, Henderson, Farabow, Garrett & Dunner

[57] ABSTRACT

A data compression method and device for an image processor such as a digital copying machine. The picture image information is divided into blocks and the blocks are characterized by the variation in density level found within each block. The individual blocks are then encoded. During encoding, the allocation of the chromatic gradation information and the resolution information are varied in accordance with the characteristics of the particular block. The amount of chromatic gradation information and the amount of resolution information are inversely proportional to each other. Because gradation information and the resolution information are varied, the total amount of information in each encoded block is constant. Therefore, the data compression is tailored to the individual requirements of each image block, but the total amount of information in each compressed block is constant. Because the data compression ratio is constant, storage and processing needs for the compressed information can be accurately and easily predicted before the data is compressed.

16 Claims, 9 Drawing Sheets

FIG. 9
QUANTIZATION IN TWO CHROMATIC GRADES
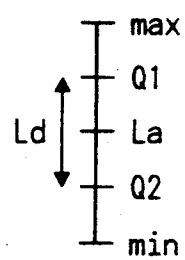
QOANTIZATION IN FOUR CHROMATIC GRADES
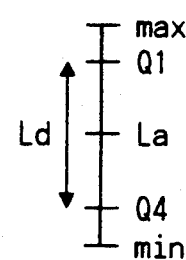
QUANTIZATION IN 16 CHROMATIC GRADES
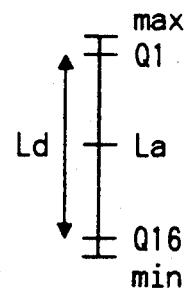
FIG. 10
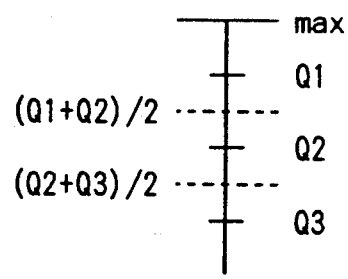

FIG. 11

| | QUANTI-ZATION LEVEL | CHROMATIC GRADATION INFORMA-TION | RESOLUTION INFORMATION | ENCODING AMOUNT |
|---|---|---|---|---|
| (a) APPROXIMATE ENCODING OF BLOCK IN TWO CHROMATIC GRADES | Q1<br>Q2 | La<br>Ld | 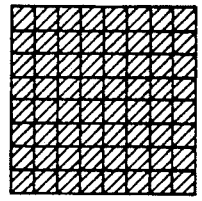 | 8X2<br>+①X64<br>=80bit |
| (b) APPROXIMATE ENCODING OF BLOCK IN FOUR CHROMATIC GRADES | Q1<br>Q2<br>Q3<br>Q4 | La<br>Ld | 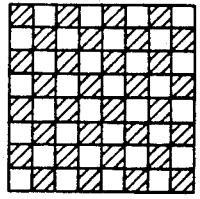 | 8X2<br>+②X32<br>=80bit |
| (c) APPROXIMATE ENCODING OF BLOCK IN 16 CHROMATIC GRADES | Q1<br>$\S$<br>Q16 | La<br>Ld | 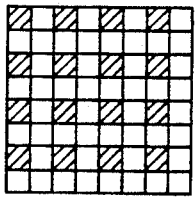 | 8X2<br>+④X16<br>=80bit |

FIG. 12

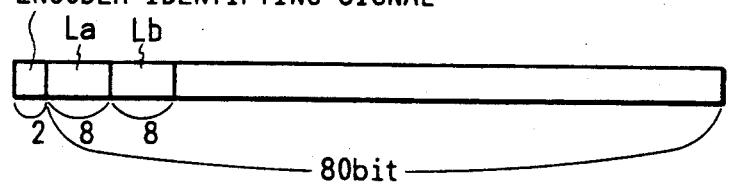

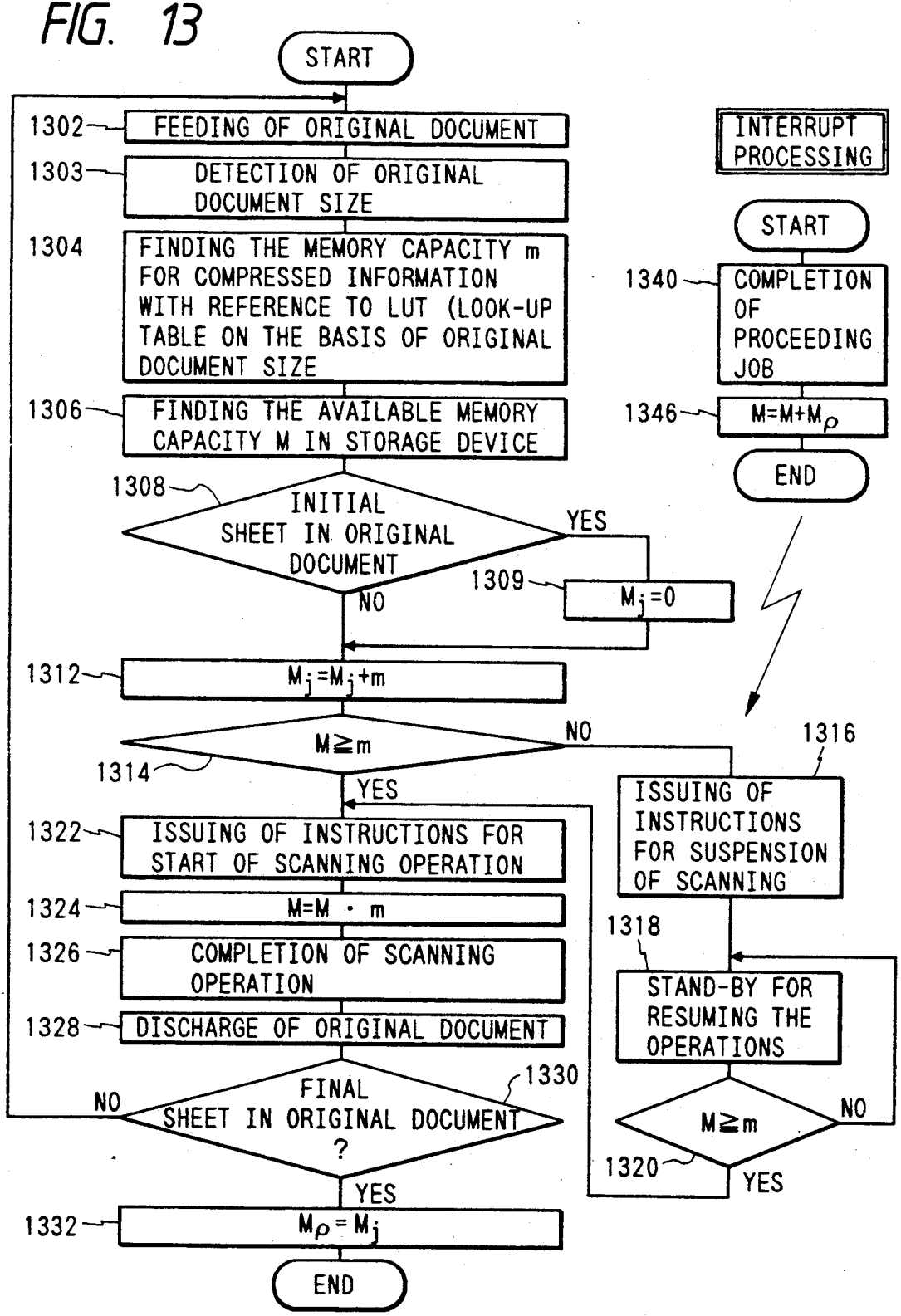

DATA COMPRESSION METHOD HAVING A FIXED RATIO OF COMPRESSION FOR IMAGE DATA, AND IMAGE DATA COMPRESSION DEVICE

BACKGROUND OF THE INVENTION

1. Field of the Invention

The present invention relates to a picture image storing method and device for storing picture image information in a large-capacity memory device. The picture information is compressed through the processing of its redundancy from the viewpoint of information theory.

2. Discussion of the Related Art

In recent years, along with the ever-increasing use of personal computer systems and word processors, the type and quantity of picture image information produced by copying and other similar processes has increased dramatically. Copying machines are now required to not only attain higher picture quality, but to also perform functions in addition to merely producing a prescribed number of copies of an original document or producing enlarged-scale or reduced-scale copies of the original document.

The various additional functions now required of copying machines will be described. An electronic recirculating document handler (RDH) electronically performs the operation of producing an arbitrarily selected number of properly sorted copies of a number of sheets in an original document. A book-binding function produces properly bound copies with the picture images of an original document edited and copied on them. In the book-binding function, two pages of the original are copied onto a single page, and the copied pages are put together, stapled in the center, folded into halves, and bound into a booklet with the copied sheets arranged as in the original document. Additionally, the functions required of copying machines include communicating picture images. Copy machines do the work of facsimile machines, and computer printers.

Digital copying machines can perform the functions required of a new copy machine. Specifically, the digital copying machine transports the individual sheets of an original document, in their regular sequential order, to the area over the platen of the copying machine by an automatic transporting process with an automatic document feeder (ADF). The original document is set, and then a scanner reads the picture images on the original document. The picture images are converted into digital signals, and temporarily stored. The copying machine then reads out the stored picture image information and prints the copies with an image output terminal (hereinafter called "IOT").

The digital copying machine also communicates picture images, and performs as a facsimile machine and a computer printer. The digital copying machine receives, in parallel through an input interface and a multiplexer, picture image information over a telephone line from a facsimile machine, a host computer, or a personal computer system in addition to the picture image information from the scanner.

The digital copying machine stores the picture image information received through the input interface from a facsimile machine, a host computer, or a personal computer system. The copying machine records the picture images at the IOT after reading the stored picture image information out of the storage device.

The digital copying machine employs a picture image storage device, which stores the picture image information in a compressed state. The data compression is achieved by reducing information redundancy, as viewed from the standpoint of information theory. Because of data compression, a larger amount of picture image information may be stored.

As shown in FIG. 15, a compressing device 101 in the picture image storing device compresses the picture image information from a scanner 100. A large-capacity storage device 102, which is composed preferably of a hard disk, stores the compressed information.

The image information transfer rate between the scanner 100 and the compressing device 101 is on the order of approximately 1 mega byte per second, which is faster than the transfer rate of the storage device 102. Therefore, if the picture image information compressed by the compressing device 101 is transferred unchanged to the storage device 102, it will not be possible to store the compressed picture image information in the storage device 102. For this reason, a page buffer, which temporarily stores the picture image information by the page, is provided between the compressing device 101 and the storage device 102. The picture image information, transferred from the compressing device 101, is stored in page units in the page buffer 103. Then, the picture image information stored temporarily in the page buffer 103 is transferred to the storage device 102 at the transfer rate of the storage device 102.

After all the picture image information of an original document is stored in the storage device 102, the picture image information stored in the storage device 102 is read out in page units at a prescribed timing. The picture image information read out of the storage device 102 is written to the page buffer 103. When all the picture image information for one page is stored in the page buffer 103, the picture image information is decoded in its regular sequence by an extending device 104, and output to the IOT 105.

The picture image storing device stores picture image information from the original document in the storage device 102 by reducing the amount of picture image information. The picture image information is encoded in the state with its redundancy as viewed from the standpoint of information theory, and compressed by means of the compressing device 101. A known encoding process generally called "the Block Truncation Coding Process" is disclosed in Japanese Laid Open Patent No. 69505-1981 (JP 69505), the contents of which are herein incorporated by reference.

The encoding process of JP 69505 encodes the picture image information of an original document, read and converted into digital signals by a scanner, by first dividing the digital signals into blocks of $L \times L$ pixels. When the density of the individual pixels in a block is taken as $a_{ij}$ for each pixel, the average picture image density pO in the block may be expressed as: $pO = \Sigma a_{ij}/L^2$. The individual pixels within the block are divided between those pixels having a density higher than the average picture image density pO and those pixels having a density lower than the average picture image density pO.

The average density of the pixels having a density lower than the average picture image density pO can be expressed as p1 by the equation $p1 = \Sigma a_{ij}/Nl$, where Nl is the number of pixels having a density lower than pO and $\Sigma$ is set for $a_{ij} \leq pO$. The number Nl of the pixels having a density lower than the average picture image density pO can be expressed by the equation $N1=\Sigma\Phi_{ij}$, where $\Phi$ is a variable that assumes the value 1 when the density of $a_{ij}\leq pO$ and assumes the value 0 when the density of $a_{ij}>pO$.

The average density of the pixels having a density higher than the average picture image density pO can be expressed as p2 by the equation $p2=\Sigma a_{ij}/N2$, where N2 is the number of pixels having a density higher than pO and $\Sigma$ is set for $a_{ij}>pO$. The number N2 of pixels having a density higher than the average picture image density pO can be expressed by the equation $N2=\Sigma\Phi_{ij}$, where $\Phi_{ij}$ is a variable that assumes the value 0 when $a_{ij}\leq pO$ and assumes the value 1 when $a_{ij}>pO$.

Integral numbers m and n are respectively smaller than the number of pixels $L^2$ in the block, and the number of chromatic grades in the density of the individual pixels. The integral number m is a parameter for deciding the magnitude of the absolute value of p1−p2 which expresses the difference between the average picture image density values p1 and p2. The integral number n is a parameter for deciding the magnitude of the numbers of pixels N1 and N2.

When $p1-p2<m$ or $n1<n$ or $n2<n$ is true, the distribution of density within the block is considered uniform, and, with all the values of $\Phi_{ij}$ taken as 0, only the average picture image density pO is used to represent the picture images within the block. As the result of this operation, the picture images within the block can be expressed by $\Phi_{ij}$, which is used as the resolution information composed entirely of the value 0 in all cases, and the average picture image density pO is used as the chromatic gradation information.

However, when $p1-p2\geq m$ and $n1\geq n$ and $n2\geq n$ holds true, the distribution of density within the block is considered not uniform, and $\Phi_{ij}$ is used as the resolution information, while the average density values p1 and p2 are used as the chromatic gradation information. The number p1 is designated as the chromatic gradation information for the pixels which have the value 0 for the $\Phi_{ij}$, namely, a density value equal to or less than the average image density pO. The number 'is designated as the chromatic gradation information for the pixels which have the value 1 for the $\Phi_{ij}$, namely, a density value higher than the average picture image density. The picture image information within the block is expressed in terms of an $\Phi_{ij}$ which has the values of 0 or 1 as the resolution information and the average density values p1 and p2 as the chromatic gradation information.

The picture image information from the original document is processed for compression by encoding the picture image information within a block. The block is expressed, by an existing binary value encoding process, with the resolution information $\Phi_{ij}$ being put together for several lines. The length of the consecutive blocks having the same information are encoded by an existing run length encoding process.

The parameter m is a deciding value for the removal of isolated noises in the picture images, and the parameter n is a deciding value for the removal of delicate fluctuations in the density within a block. Thus, the parameters m and n are directly proportional to the uniformity of the picture images within the block.

The electronic recirculating document handler function produces an arbitrarily selected number of properly sorted copies of a number of sheets of an original document. In order to realize the electronic recirculating document handler function with picture image storing device operating by a picture image coding process, the picture image information on a plurality of sheets of the original document, are stored in regular sequence and stored in a compressed state in the storage device 102 by way of the page buffer 103. The compressed picture image information is read out in page units, in regular sequence and decoded in regular sequence by the extending device 104. The decoded picture image information is recorded in the regular sequence of the pages by the IOT 105. The device can produce an arbitrarily decided number of properly sorted copies of a number of sheets the original document by repeating the operations of reading the picture image information of the original document out of the IOT 105 and recording the picture image information with the IOT 105 a number of times corresponding to the number of copies desired.

The known copying machine described above has the following disadvantages.

The picture image storing device 102 temporarily stores picture image information after the picture image information is compressed by the picture image encoding process performed by the compressing device 101. The storage device 102 has a limited memory capacity. Therefore, in the realization of the electronic recirculating document handler function, the remaining capacity of the storage device 102 may be reduced to zero when an attempt is made, while the storage device 102 has a small memory capacity left, to store the compressed picture image information read an original document. Additional picture image information may not be stored in the storage device 102. Any attempt to store additional picture image information into the storage device 102 will result in defects by page units in some part of a series of sheets of the original document. Therefore, reading original documents with the scanner 100 is discontinued until the required memory capacity becomes available in the storage device 102.

The reading operation of an original document is resumed when a margin of memory capacity appears in the storage device 102. When the operation for reading an original document is resumed, the original document on which the reading operation was interrupted is set in the automatic document feeder, and is read after specifying the read operation again. Therefore, the operation may become complicated, depending on the memory capacity remaining in the storage device 102.

The disadvantage described above can be overcome by determining in advance, whether there remains sufficient memory capacity in the storage device 102 for storing, in the compressed state, the total picture image information.

The picture image storing device can readily find the memory capacity remaining in the storage device 102 if the picture image storing device controls the residual memory capacity of the storage device 102. The amount of information on the original document before the compressing process is performed can be determined based upon the resolution when the original document is read by the scanner 100 and the size of the original document. The amount of information after compressing the picture image information will vary among individual original documents as the compression efficiency achieved for each document will vary. Hence, it is not possible to determine in advance the amount of compressed information in any given original document.

The known picture image encoding process discriminates the picture image information, within a given block, on the basis of the parameters m and n. The picture image information within a given block is expressed in terms of the resolution information $\Phi_{ij}$ and the chromatic gradation information p0, p1, and p2. The picture image information, with the values of $\Phi_{ij}$, namely, the resolution information put together for several lines, is encoded by an already known binary value encoding process, and the length in which the blocks having the same information occur in succession is encoded by a known process of run length encoding. Thus, depending on the characteristics of the picture image information within the block discriminated by the parameters m and n, the amount of information in the resolution information $\Phi_{ij}$ varies, and the chromatic gradation information p0, p1, and p2, which express the picture image information in a given block is different. Moreover, the resolution information $\Phi_{ij}$ is encoded by a known binary value encoding process and then encoded further by the run length encoding process. Therefore, the amount of encoded picture image information varies depending on the contents of the individual original documents, and determining the amount of the information in any compressed state original document is consequently not possible.

The known picture image encoding process can only express the pixels within a given block in terms of the three chromatic grades in the chromatic gradation information p0, p1, and p2. If an attempt is made at increasing the block size L for the purpose of improving the encoding efficiency, the quality of picture images will deteriorate considerably because the picture image information in a larger area can only be expressed in the three chromatic grades.

In the known picture image encoding process, the resolution information $\Phi_{ij}$ is allocated uniformly to all the individual pixels in the block, regardless of the characteristics of the picture image information. The uniform resolution allocation increases the redundancy of information.

As described so far, the known picture image storing device cannot determine in advance the amount of information resulting from the compressed picture image information of the original document, and the device, therefore, offers no means of deciding in advance whether or not there remains sufficient memory capacity in the storage device 102 for the storage of the compressed picture image information. Consequently, the operations for the reading of an original document into the system will be complicated. In addition, the quality of the picture images will deteriorate considerably if an attempt is made to increase the block size L for the purpose of improving the encoding efficiency, and the amount information in the block after it is compressed will be redundant.

To overcoming the above disadvantages, the picture image information of an original document may be stored without compression in the storage device 102. Direct storage requires a change in the basic design concept of the picture image storing device. The amount of information in the original document can be found on the basis of the resolution the original document and the size of and number of sheets in the original document. Hence, by comparing the amount of the information in the original document with the memory capacity remaining in the storage device 102, it will be possible to determine in advance whether or not the picture image information of the original document intended for the reading operation can be stored in the storage device 102.

However, the process just described will be required to process an enormous amount of data. A single sheet in an original document in A4 size entered at a resolution of 400 dpi has as much as two mega bytes of information. Therefore, the number of sheets in an original document which can be stored in the storage device 102 will be reduced drastically because of the enormous amount of information to be stored. The non-compression process will not be capable of achieving any practically feasible level of performance in the electronic recirculating document handler function, the bookbinding function, and so forth which are required of digital copying machines. On the other hand, if a copying machine were provided with a storage device 102 having a memory capacity sufficiently large to store the picture image information of a large number of sheets in a original document without data compression, the storage device 102 would be very large, and considerable cost increase would be incurred.

In order to store compressed picture image information and determine in advance whether it is possible to store the compressed picture image information in the storage device 102, a new process which measures the ratio of compression in advance of the reading of the original document is performed. An estimated average ratio of compression per original document estimated in advance by a statistical process may also be used.

Specifically, the device which measures the ratio of compression performs a prescanning operation in advance of the regular reading operation. The ratio of compression is thereby measured in advance for the picture image information of the original document. On the basis of the ratio of compression, whether or not there remains sufficient memory capacity in the storage device 102 for the storage of the compressed picture image information is determined.

The prescanning operation must be performed ahead of the reading operation and it is therefore necessary to perform the additional sequential operations and their control for the prescan. Consequently, controlling the copying operations will be more complicated, and the number of copies produced in a unit duration of time decreases in proportion to the time necessary for the prescanning operation and the arithmetic operations incidentally required. In order to prevent a decrease in the number of copies which can be produced in a unit of time, the duration of time spent for the back scan operation is allocated to the prescan. However, the device will not be able to perform any concurrent picture image processing of a number of picture images input from other input devices such as a facsimile machine in the course of the back scan operation.

The other known solution is to provide device which estimates the ratio of compression for an original document in advance by a statistical process. The average ratio of compression estimated for an original document is applied to a process for determining the amount of information, after compression. On the basis of the amount of information thus obtained, whether or not there remains memory capacity in the storage device 102 sufficient for the storage of the compressed picture image information is determined.

The ratio of compression for the original document is only an average ratio of compression estimated by a statistical method. As the applied ratio of compression is different from the actual ratio of compression for the original document, the probability remains that the amount of compressed information actually read from the original document will be in excess of the memory capacity remaining in the storage device 102. The information to be stored may be excessive even if a safety factor is added to the estimated average ratio of compression. In such a case, the picture image information read from the original document will not be stored in the storage device 102, and, consequently, the problem mentioned above will remain unsolved and pending. This probability is associated with the fact that the amount of compressed information increases as the ratio of compression is reduced to a ratio of compression much lower than the average ratio of compression. If picture images in halftone, such as photographs, are included in an original document which is mainly composed of characters when the chromatic gradation information is being processed by an error diffusing method, the estimated compression ratio will be in error.

Furthermore, the device, which operates with the picture image encoding process described above, still suffers from a considerable deterioration in the quality of the picture images and redundancy in the amount of compressed information, if the block size L is enlarged for the purpose of improving the encoding efficiency.

SUMMARY OF THE INVENTION

An object of the present invention is to provide a picture image storing method and device which are capable of deciding in advance whether or not compressed input picture image information can be stored in a storage device, without complicating the copying operation's control.

Another object of the present invention is to prevent a decrease in the number of copies which can be produced within a unit duration of time, without impairing the concurrent picture image processing capabilities for multiple streams of picture image information.

A further object of the present invention is to offer a picture image storing method and device which realize increased ease in controlling files in the storage device.

A further object of the present invention is to offer a picture image storing method and device which minimize deterioration in the quality of picture images even when the block size is enlarged in order to improve the encoding efficiency in the compression of picture image information.

A further object of the present invention is to prevent redundancy in the compressed picture image information.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the above objects, according to one aspect of the present invention, a data compression method having a fixed ratio of compression for image data expressed in image pixels having more than one image gradation level is provided. The data compression method comprising the steps of dividing the image data to produce blocks of data; characterizing a block of data according to the data within the block; and encoding a block of data according to the characterization of the block to generate an encoded block, each encoded block having a plurality of encoded pixels having at least one bit of information to express an image gradation level. The encoding step comprising the sub steps of selecting a number of encoded pixels to express the block; and selecting a number of bits to express the image gradation level of each encoded pixel, the number of bits being inversely proportional to the number of encoded pixels selected to express the block. To achieve the above objects, according to another aspect of the present invention, a data compression method having a fixed ratio of compression for image data expressed in image pixels having more than one image gradation level is provided. The data compression method comprising the steps of dividing the data into blocks of data; and encoding a block of data a plurality of times to generate a plurality of encoded blocks, each encoded block having a plurality of encoded pixels having at least one bit of information to express an image gradation level and each encoded block having a different number of encoded pixels. The encoding step comprising the sub steps of selecting a number of encoded pixels to express the block; and selecting a number of bits to express the image gradation level of each encoded pixel, the number of bits being inversely proportional to the number of encoded pixels selected to express the block. An additional step is selecting one of the plurality of encoded blocks, the selected encoded block having the least distortion among the plurality of encoded blocks.

According to the present invention, the number of pixels selected in each block multiplied by the number of bits used to express each pixel selected is a constant. Because this value is a constant, the amount of information in each compressed block will be constant.

BRIEF DESCRIPTION OF THE DRAWINGS

The accompanying drawings, which are incorporated in and constitute a part of this Specification illustrate embodiments of the present invention and, together with the description, serve to explain the objects, advantages and principles of the invention. In the drawings:

FIG. 9 is a chart illustrating a method quantization;

FIG. 10 is a chart illustrating how the level of quantization is decided by arithmetic operations;

FIG. 11 is a diagram illustrating a method of encoding according to a preferred embodiment of the present invention;

FIG. 12 is a schematic drawing illustrating the encoded picture image information;

FIG. 13 is a flow chart illustrating the operation of a first embodiment of the picture image storing device according to the present invention;

DETAILED DESCRIPTION OF THE PREFERRED EMBODIMENTS

Figure 1:
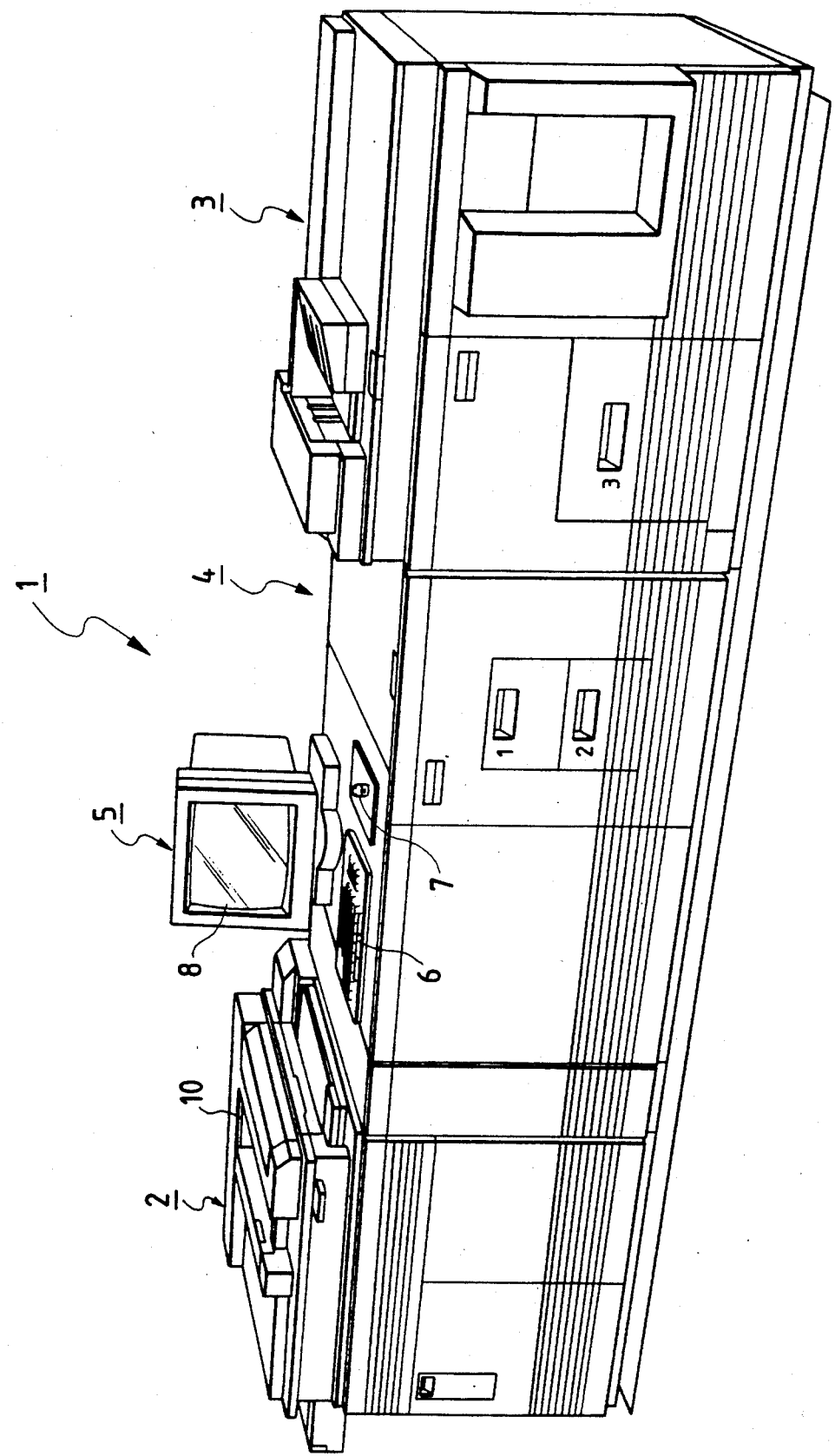
FIG. 1 is an external perspective view of a digital copying machine to which the picture image storing device according to a preferred embodiment of the present invention can be applied.

The preferred embodiments of the present invention include a picture image storing method for entering picture image information, compressing the entered picture image information, storing the compressed picture image information, and then reading out and extending the stored picture image information. The compression of the picture image information is performed by dividing the picture image information into blocks, discriminating the picture image information divided into blocks in accordance with the characteristics of the information in the respective blocks, and encoding the discriminated picture image information. During encoding, the allocation of the chromatic gradation information and the resolution information are varied in accordance with the characteristics of the particular picture image information, so that the amount of information of the encoded picture image information will be constant.

The picture image storing device according to preferred embodiment of the present invention include a picture image input means, which inputs the picture image information, a compressing means, which compresses the picture image information input with the picture image input means, a storing means, which stores the picture image information compressed by the compressing means, and an extending means, which extends the picture image information read out of this storage device. The compressing means comprises a discriminating means, which divides the picture image information into blocks and discriminates on the basis of its characteristics the picture image information which has been divided into blocks, a plural number of encoding means, and a selecting means. The discriminated picture image information is encoded so that the amount of information in the discriminated picture image information will be constant in the state wherein the allocations of the chromatic gradation information and the resolution information are varied in accordance with the characteristics of the discriminated picture image information. The selecting means, working on the basis of the result of the discrimination made by the discriminating means, select the picture image information encoded by the encoding means.

The entered picture image information consists, for example, of picture image information read by a scanner. However, the source of picture image information is not limited to a scanner, and the picture image information may be obtained from a telephone line, a facsimile machine or the output of a host computer or a personal computer system.

A hard disk is preferably used for the storage means, but the storage means is not limited to a hard disk unit. Other devices, such as a floppy disk or a semiconductor storage element, may be used, so long as the storage device is capable of storing the compressed picture image information.

The picture image information input into the device is divided into blocks composed of L×L pixels. The value of the L may be arbitrarily selected, and the block does not necessarily have to be in a regular square shape, but may be a block in another shape, such as an oblong rectangle.

The discrimination of the picture image information mentioned is preferably made on the basis of whether the density of the pixels in a given block changes drastically.

Multiple encoders corresponding to a multiple number of chromatic grades are preferably used as the encoding means mentioned above.

The preferred embodiments of the present invention will now be described in detail while referring to the accompanying drawings, in which like reference characters designate like or corresponding parts throughout the several drawings.

FIG. 1 is an external perspective view illustrating a digital copying machine 1 to which the picture image storing device according to the preferred embodiments of the present invention is applied.

The digital copying machine 1 performs many functions. The machine 1 performs copying on both faces and multiple image copying on a single face. The electronic recirculating document handler (RDH) performs electronically controlled operations for producing an arbitrarily selected number of properly sorted copies of a number of sheets of an original document. A book-binding function produces bound copies of the edited original document. In the book-binding function, the machine copies the sheets of an original document with two original sheets printed on one side of one divided page of the recording paper. The book function can copy four sheets of an original onto a single original when in the duplex mode. The book pages are collated and stapled in the center. The book pages are folded into halves, and bound into a booklet with the pages of the booklet arranged as in the original document.

The digital copying machine 1 also communicates picture images. The machine 1 functions as a facsimile machine and as a printer which prints out information from a host computer, a personal computer system, or the like.

The digital copying machine 1 has an image input terminal 2 (hereinafter called "IIT"). The image input terminal 2 reads the picture images on an original document and converts the picture images into electrical signals, and performs such basic processing operations as zigzag correction or stagger correction on the picture images. An image output terminal 3 (hereinafter called "IOT"), stores, in memory, the picture image information transferred from the IIT 2, performs necessary second-stage processing operations on the picture image information, and records and outputs the picture images. A controller 4 controls the operations of the IIT 2 and the IOT 3.

The controller 4 is provided with a user interface 5 (hereinafter called "UI"), by which the operator specifies the copying operations. The UI 5 has a keyboard 6 and a mouse 7, through which the operator specifies the copying operations. A display unit 8 displays the particulars of the copying operations specified by the operator.

In this example, the IIT 2 has an automatic document feeder 10 (ADF), positioned in the upper area of the IIT 2. The automatic document feeder 10 transports the individual sheets of an original document to the area over a platen in the IIT 2. The automatic document feeder 10 may be a dual automatic document feeder, which automatically transports the individual sheets of an original document 11, reversing the top face and the back face, to the area over the platen of the IIT 2.

The automatic document feeder 10 is built into a cover unit, which covers the area over the platen in the main unit of the IIT 2. The cover can be opened and closed as appropriate, as shown in FIG. 1.

Figure 2:
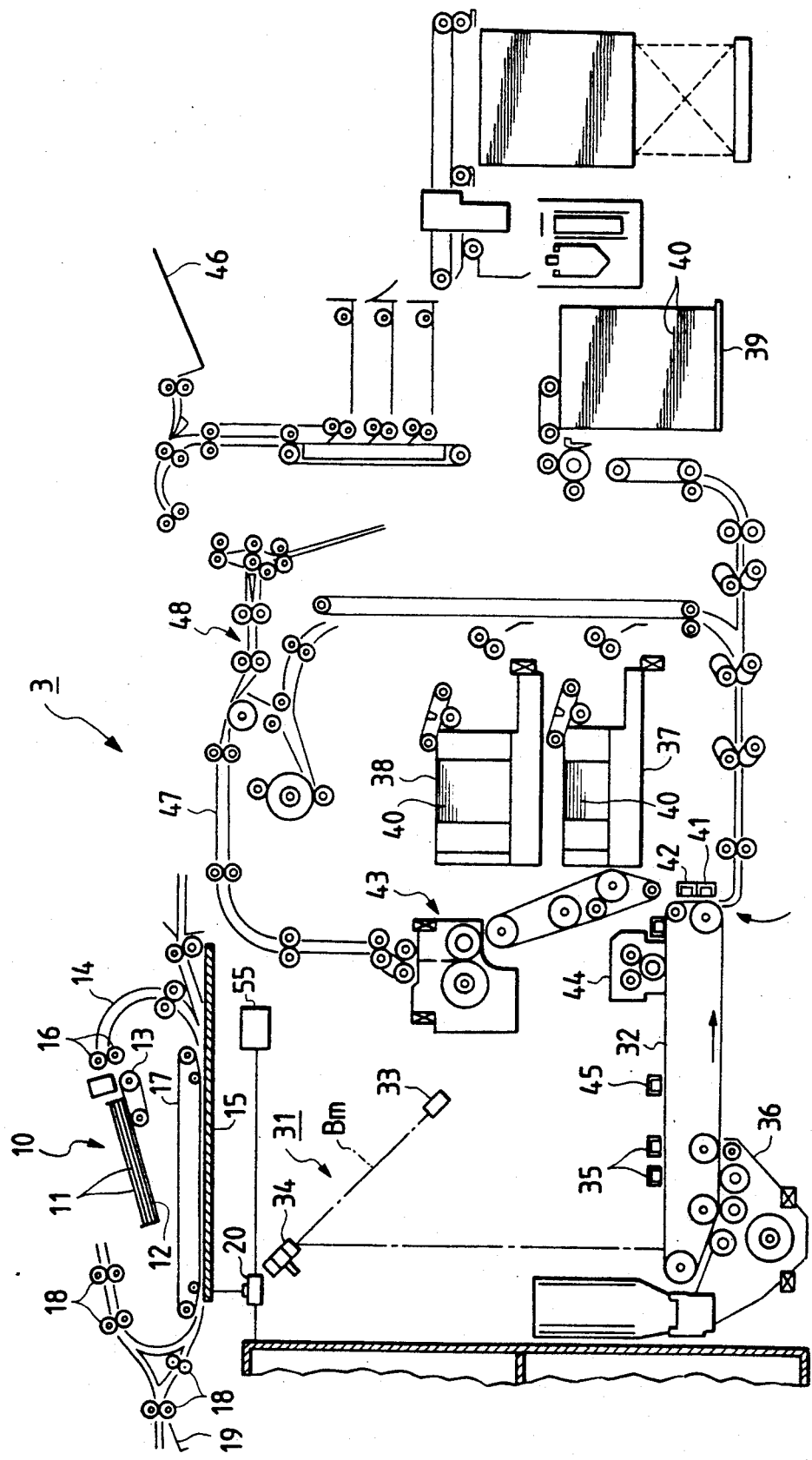
FIG. 2 is a configuration drawing of the digital copying machine shown in FIG. 1.

Referring to FIG. 2, the automatic document feeder 10 will be described. An original document feeding tray 12 holds the original document 11. A feed belt 13 feeds one sheet after another of the original document 11 stored in the original document feeding tray 12. A transport roller 16 transports a sheet of the original document 11 fed out by the feed belt 13 to the platen 15 by way of a paper chute 14. A transport belt 17 transports the sheet of the original document 11 to the original document setting position above the platen 15. Discharge rollers 18 discharge the sheet of the original document 11 fed out by the transport belt 17 when the reading operation is completed on the picture images of the original document 11 as mounted over the platen 15. An original document receiving tray 19 contains the discharged sheet of the original document 11.

Figure 5:
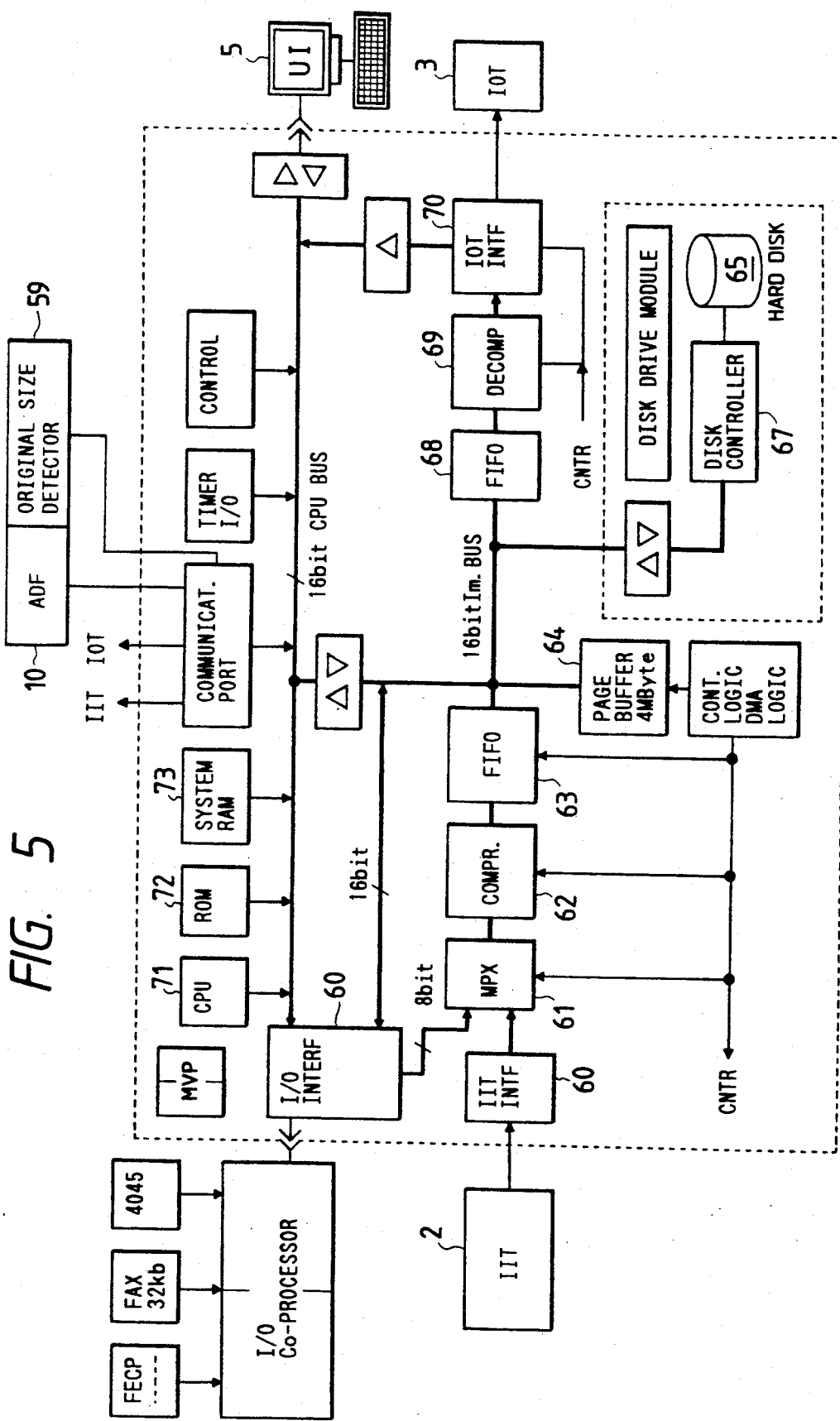
FIG. 5 is a block diagram illustrating an embodiment of the picture image storing device according to a preferred embodiment of the present invention.

The automatic document feeder 10 is provided with an original document size detector 50, which detects the size of an original document 11. The original document size detector 50 has a number of reflexive type optical sensors which are arranged on the original document feeding tray 12 in the automatic document feeder 10, as shown in FIG. 5. The optical sensors are arranged over a position which an original document 11 in the A4 size passes. Thus, when an original document 11 is set in the original document feeding tray 12, the optical sensors detect the size of the original document 11 by the presence or absence of reflected light. A central processing unit (CPU) 71 distinguishes the size of the original document 11 using an output signal from the size detector 50.

Figure 3:
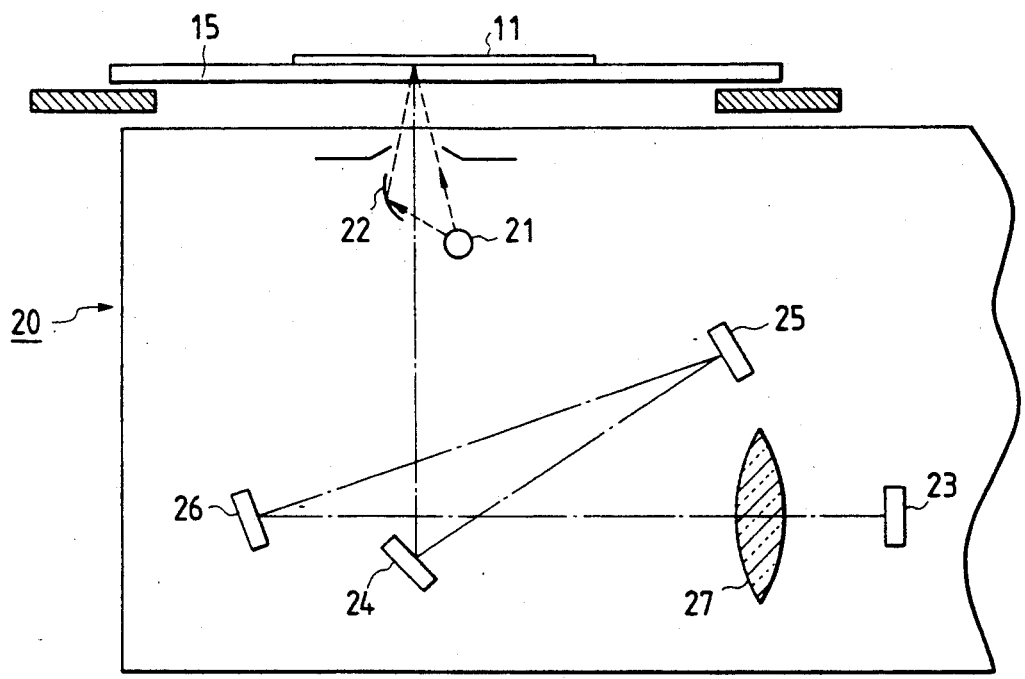
FIG. 3 is a configuration drawing illustrating a scanner.

The original document 11 is transported by the automatic document feeder 10 to the area over the platen 15 in the main unit of the IIT 2. Referring to FIG. 3, a scanner 20 integrated into the IIT 2 reads the original document 11. The placement of the scanner 20 in the digital copying machine 1 is shown in FIG. 2. A light source 21 in the scanner 20 projects a beam of light to illuminate the original document 11 placed over the platen 15. A reflecting plate 22 reflects the light incident from the light source 21 toward the original document 11. A plurality of mirrors 24, 25, and 26 lead the light reflected from the original document 11 to an image sensor array 23, which is preferably comprised of charge coupled devices (CCD). A lens 27 focuses the picture image light conducted from mirrors 24, 25, and 26 onto the image sensor array 23. A driving mechanism 55 moves the scanner 20 under the platen 15 in the subsidiary scanning direction and back. The scanner 20 reads the picture images of the original document 11, which is placed over the platen 15, with the image sensor array 23 while the scanner moves under the platen 15 in the subsidiary scanning direction.

Figure 4:
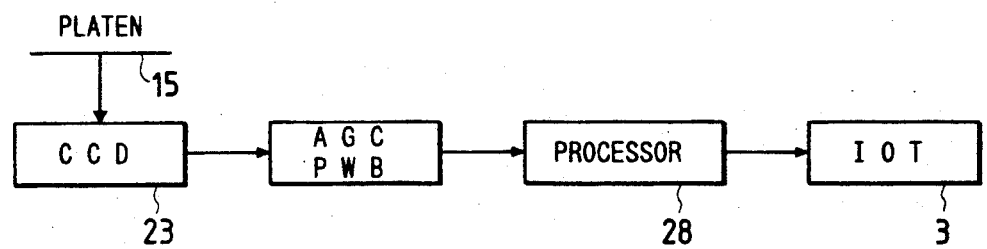
FIG. 4 is a block diagram illustrating an Image Input Terminal (IIT)

As shown in FIG. 4, the picture image information read from the original document 11 by the image sensor array 23 in the scanner 20 is transferred to a processor 28. The processor 28 performs basic processing operations such as zigzag correction on the picture image information. The picture image information is then output to the IOT 3.

The picture image information transferred to the IOT 3 is compressed and extended by the picture image storing device according to the present invention. Then, as shown in FIG. 2, the picture image information read out of the picture image storing device is converted into optical signals by a raster output scanner (ROS) unit 31. The optical signals are converted into an image which exposes a photoreceptor belt 32.

Referring to FIG. 2, the raster output scanner unit 31 forms picture images on a photoreceptor belt 32 corresponding to the picture image information. A rotating polygon mirror 34 reflects the beam of light from a semiconductor laser unit 33 onto the photoreceptor belt 32 over a prescribed scanning range by reflecting the beam off its reflecting facets. The semiconductor laser unit 33 oscillates in accordance with the picture image information. The laser beam is scanned in the axial direction of the photoreceptor belt 32 with the polygon mirror 34. The photoreceptor belt 32 is charged to a prescribed electric potential by a primary charger 35 prior to scanning so that latent electrostatic images are formed on the surface of the photoreceptor belt 32 during scanning.

The latent electrostatic images are developed in black toner by the developing device 36 to form toner images on the photoreceptor belt 32. A transfer charger 41 transfers the toner image from the photoreceptor belt 32 to the surface of recording paper 40. The recording paper 40 is fed from paper feeding cassettes 37 or 38 which are arranged inside the main unit of the IOT 3. A separating charger 42 separates the recording paper 40 from the photoreceptor belt 32 with an electric charge. The recording paper 40 is transported to a fixing device or fuser 43, and the toner images are fixed by fusion on the recording paper 40.

After the completion of the image transfer process, a cleaner 44 cleans the surface of the photoreceptor belt 32 of the residual toner, paper powder, etc. An electric charge eliminator 45 removes the residual electric charge on the belt 32 by charging. The belt 32 is now ready for the next picture image recording process.

The recording paper 40 is discharged into the paper discharge tray 46.

In modes such as the duplex copying mode and the single face multiple image copying mode, the recording paper 40 with toner images fixed on it is not discharged into the paper discharge tray, but the recording paper 40 is transported through a transport channel 47 and a paper reversing mechanism 48 back to the image transfer section. The paper is set on the face either as it is or in reverse, and toner images are transferred and fused on the recording paper again. After the second transfer and fusion of toner images, the recording paper 40 is discharged into the paper discharge tray 46.

FIG. 5 is a block diagram illustrating a first embodiment of the picture image storing device according to the present invention applied to a digital copying machine constructed in the manner described above.

Referring to FIG. 5, the picture image storing device will be described. An input interface 60 receives picture image information from either the scanner 20 integrated in the IIT 2, a facsimile machine, or a personal computer system. A multiplexer 61 (MPX) selects the picture image information transferred from the scanner 20, a facsimile machine, or a personal computer system. The multiplexer 61 performs selective processing of picture image information in parallel operations selecting on a time-division basis picture image information transferred from the scanner 20, a facsimile machine, or a personal computer system.

A compressing device 62 compresses the picture image information from the multiplexer 61. A FIFO (first in—first out) transfer rate conversion buffer 63 converts the transfer rate for the picture image information compressed by the compressing device 62. A page buffer 64 temporarily stores the picture image information transferred from the transfer rate conversion buffer 63, and transfers the picture image information to a storage device 65, in synchronization with the access time attainable by the storage device 65. The storage device 65, preferably a hard disk, stores the picture image information transferred from the page buffer 64. A disk controller 17 controls the storing operations of the storage device 65.

Another FIFO transfer rate conversion buffer 68 regulates the transfer rate for the picture image information read out of the storage device 65. An extending device 69 extends the compressed picture image information stored in the storage device 65, converting the compressed picture image information back into its original state. An output interface 70 transfers the picture image information extended by the extending device 69 to the IOT 3. The IOT 3 records and outputs the picture images in the picture image information after performing necessary secondary processing operations on the information.

A Central Processing Unit 71 (CPU) controls the multiplexer 61, the input interface 61, the compressing device 62, the transfer rate conversion buffer 63, the page buffer memory device 64, the transfer rate conversion buffer 68, the extending device 69, the output interface 70, and the IOT 3. A read only memory device 72 (ROM) stores the programs executed by the CPU 71. A random access memory 73 (RAM) stores the data necessary for such operations as processing picture images, and storing the data as it is generated.

Figure 6:
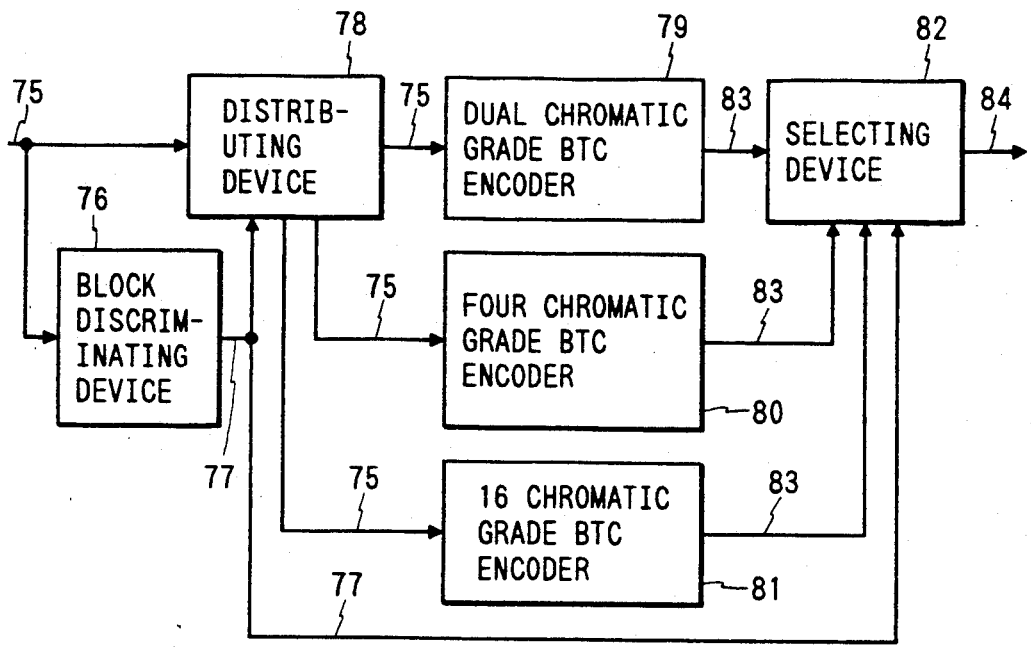
FIG. 6 is a block diagram illustrating compressing device.

FIG. 6 presents a block diagram illustrating the structure of the compressing device 62 shown in FIG. 5.

Figure 7:
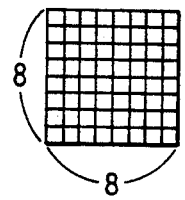
FIG. 7 is a chart illustrating the state of picture image signals divided into blocks.

In FIG. 6, reference number 75 denotes the picture image information from the IIT 2. The picture image information 75 is divided into blocks composed of L×L image pixels as shown in FIG. 7 by a known process. In this example, "8" is used for the value of L, but the value of L is not limited to "8", and may be any value such as "2", "4", and "6". The shape of the block is not restricted to a regular square shape, but may be an oblong rectangle or the like composed of $L^2$ image pixels.

Each block has two characteristics that influence the expression of the image: the number of image pixels within each block and the number of bits used to express each image pixel. The greater the number of pixels within each block the higher the resolution, while the greater the number of bits used to express each pixel the higher the number of chromatic gradations that are used to express the pixels. Each block entering the compressing device 62 will be expressed in the same number of image pixels each of which will have the same number of chromatic grades. During data compression, information is compressed so that less storage space is required to store the image block data. In performing data compression on the blocks, decisions are made for each block as to how much information should be used to express the compressed block. A compressed block will be expressed by encoded pixels which may or may not be the same as the image pixels in the uncompressed block. Generally, the compressed block will be expressed with less information than the corresponding uncompressed block applied to the data compression device 62.

A block discriminating device 76 determines the degree of fluctuation in density in a given block. The input picture image information 75 is analyzed in block units, and each block is identified as a block with considerable changes in density, a block with a relatively flat gradient density or, a block with intermediate density distribution. The block discriminating device 76 then outputs a result 77 to a distributing device and a selecting device, which will be described later. The process of categorizing the degree of fluctuation in density for a given block involves calculating whether the block is a block with considerable changes in density, a block with relatively flat changes in density, or a block with intermediate changes in density.

The density decision process is performed by calculating the value $\sigma$, which represents the dispersion of density in the image pixels in the particular block. When the density dispersion value $\sigma$ is large, the particular block is characterized as having a considerable density change. When the density dispersion value $\sigma$ is small, the particular block is characterized as having a flat gradient density. When the density dispersion value $\sigma$ is a medium value between these, the particular block is characterized as having an intermediate density distribution.

However, the method of discriminating the blocks is not restricted to the method mentioned above. The discrimination method may also differentiate the density value of the picture image information in a given block by finding the maximum value and/or the minimum value and categorizing density in the block by the largeness or smallness of the values found.

A distributing device 78 distributes the picture image information 75 in the input block to either dual chromatic grade BTC encoder or an m-chromatic grade BTC encoder. The distributing device 78 distributes in accordance with the result 77 of the block density characterization performed by the block discriminating device 76.

Chromatic grade BTC encoders 79, 80 and 81 are provided in a total of m-pieces ranging from the dual chromatic grade BTC encoder to the m-chromatic grade BTC encoder. In this example, three encoders are provided: a 4 chromatic grade BTC encoder 80, a 16 chromatic grade BTC encoder 81, and the dual chromatic grade BTC encoder 79. The dual chromatic grade BTC encoder 79 performs block approximation encoding in 2 chromatic grades. Similarly, the 4 chromatic grade encoder 80 performs an encoding process in 4 chromatic grades, and the 16 chromatic grade encoder 81 performs an encoding process in 16 chromatic grades.

In this manner, 2, 4, or 16 chromatic grades are employed the quantization of the pixels in a block. Therefore, the deterioration of the picture image quality will be relatively small even if the block size L is enlarged for encoding with improved encoding efficiency.

A selecting device 82 selects the picture image information 83 encoded by any one of the encoders 79, 80 or 81. The selecting device 82 selects in accordance with the result 77 for the block density characterization decided by the block discriminating device 76. The selecting device 82 outputs the encoded picture image information selected as encoded picture image information 84.

Figure 8:
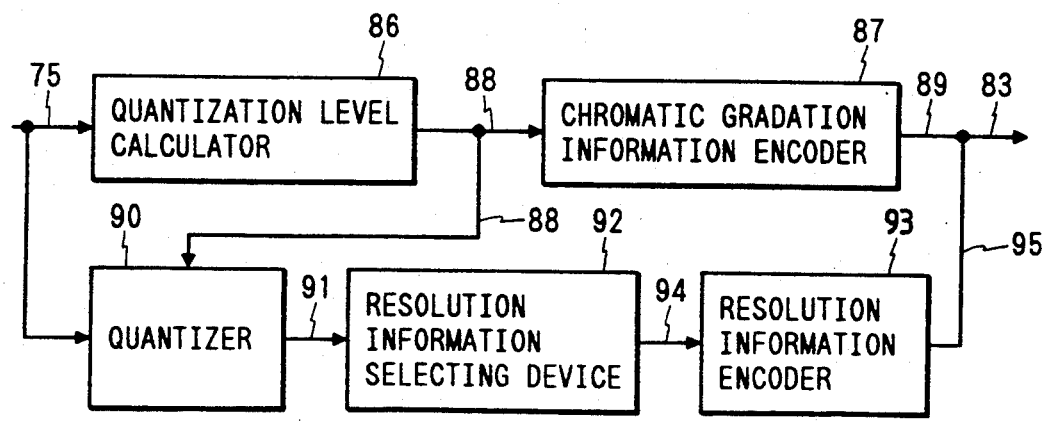
FIG. 8 is a block diagram illustrating encoders used in the device shown in FIG. 6.

FIG. 8 presents a block diagram illustrating the construction of the chromatic grade BTC encoders.

The picture image information 75 in block units distributed by the distributing device 78 is input into a quantization level calculator 86. The quantization level calculator 86 determines a level of quantization and a threshold value for quantization. Referring to FIG. 9, the quantization level calculator 86 performs a process of linear quantization by deciding the maximum level of quantization Q1, and the minimum levels of quantization Q2, Q4, or Q16, for each number of chromatic grades, and then dividing the intervals between the levels into equal sections. The maximum level of quantization Q1 is the average of the density values for n-pixels in the order of greater density starting with the maximum value max for the density of pixels in the block. In the same manner, the minimum level of quantization Q2, Q4, or Q16 is the average of the density values for n-pixels in the order of smaller density starting from the minimum density value min. When the number of pixels in a given block is expressed as $L^2$ and the number of chromatic grades is expressed as liter, the parameter n is an integral number approximately on the order expressed by the equation, $n = L^2/liter$.

The method of deciding the maximum level of quantization and the minimum level of quantization is not limited to that described above. For example, the maximum density value max and the minimum density value min in a given block may be used as they are. Moreover, the method is not limited to the linear quantization with the interval between the maximum level of quantization and the minimum level of quantization divided into equal sections. For example, the interval may be quantized in a non-linear form.

A chromatic gradation information encoder 87 encodes the levels of quantization 88 which are output from the quantization level calculator 86. Specifically, the average of the maximum level of quantization, the minimum level of quantization La, and the difference between these two levels Lb are output as signals 89 expressing the encoded chromatic gradation.

In this example, the values La and Lb are expressed in the same number of bits as express one pixel of the input picture image information. For example, when the input picture information 75 is expressed in eight bits per pixel, the encoded chromatic gradation information 89 will have a total of 16 bits.

However, the method of encoding the quantization levels is not limited, and the maximum level of quantization Q1 and the minimum level of quantization Q2, Q4 or Q16 may be used directly.

If the quantization level calculator 86 performs non-linear quantization, the extent of the changes in the quantizing steps (i.e., the difference between the adjacent levels of quantization) should also be encoded as a part of the chromatic gradation information.

A quantizer 90 quantizes the distributed picture image information 75. The quantizer 90 quantizes in accordance with the level of quantization 88 from the quantization level calculator 86. The threshold value for the quantization is the average of the corresponding levels of quantization. For example, as shown in FIG. 10, the threshold value between the level of quantization Q1 and the level of quantization Q2 is $(Q1+Q2)/2$ and the threshold value between the levels of quantization Q2 and Q3 is $(Q2+Q3)/2$.

In this example, the encoders 79, 80 and 81 respectively perform quantizing operations of the picture image information in two chromatic grades, four chromatic grades, and 16 chromatic grades. The resolution information 91 quantized by the encoders is respectively expressed as one bit, two bits, or four bits for one pixel. The resolution information 91 quantized by the dual chromatic grade BTC encoder 79 will be in one bit per pixel; the resolution information 91 quantized by the four chromatic grade BTC encoder 80 will be in two bits per pixel; the resolution information 91 quantized by the 16 chromatic grade BTC encoder 81 will be four bits per pixel.

A resolution information selecting device 92 outputs the necessary resolution information. The resolution information selecting device 92 eliminates visually redundant information from the resolution information 91 and processes the resolution information 91 which corresponds with the number of chromatic grades quantized by the quantizer 90.

According to Weber's Law, human visual perception is more sensitive to differences in chromatic gradation in an image area where the density gradient is relatively flat and less sensitive to differences in chromatic gradation in an image area where the density gradient is steep. The data compression method according to the first preferred embodiment capitalizes on Weber's Law by providing for a relatively large number of chromatic grades, and relatively low resolution, in an image area with a flat density gradient. Thus, in image areas where the density gradient is flat, the number of bits per pixel will be correspondingly high, while the number of pixels within a block will be correspondingly low. Conversely, the method provides for a relatively small number of chromatic grades, and relatively high resolution, in an image area with a steep density gradient. Thus, in image areas where the density gradient is steep, the number of bits per pixel will be correspondingly low, while the number of pixel within a block will be correspondingly high.

Image deterioration caused by the encoding of information tends to be less noticeable. This method also improves encoding efficiency by avoiding the encoding of redundant chromatic and resolution information.

Referring to FIG. 8, the varying chromatic grade encoding process will be discussed in greater detail. In the encoding of information in two chromatic grades, that is the encoding process applied to picture image areas with considerable changes in density, the resolution information is selected with respect to all the 64 pixels, i.e. 8 pixels × 8 pixels = 64 pixels, as shown in FIG. 11 (a). In the encoding process of information in four chromatic grades, that is the encoding process as applied to those picture image areas with intermediate density distribution, the resolution information for 32 pixels, i.e. 8 pixels × 8 pixels = 64 pixels/2 = 32 pixels, is selected as shown in FIG. 11 (b). The 32 pixels are selected in a zigzag lattice pattern. When the encoding process is performed in 16 chromatic grades, that is the encoding process as applied to those picture image areas with relatively flat gradient density, the resolution information for 16 pixels, i.e. 8 pixels/2 × 8 pixels/2 = 16, in the case of 8 pixels × 8 pixels, is selected as shown in FIG. 11 (c). The 16 pixels are selected in a straight lattice pattern.

However, the manner of selecting the resolution information is not restricted to that just described. For example, the resolution information in 32 pixels may be selected in a zigzag lattice pattern in the case of the encoding in two chromatic grades. Modification may be made as long as the allocation of the resolution information is reduced when the chromatic gradation information is allocated in a large amount to certain blocks, and the allocation of the resolution information is increased when the chromatic gradation information is allocated in a small amount.

A resolution information encoder 93 encodes the selected resolution information 94.

In this example, the device does not employ an encoding process that reduces the redundancy of information as viewed from the standpoint of an information theory, such as the Hufmann encoding process. The encoding process expresses the selected resolution information in binary numbers without any redundancy reduction encoding, and outputs the information as the resolution information 95. Therefore, the amount of information in the resolution information 95 will be a number of bits that correspond to the number of pixels in the block selected by the resolution information selecting device 92.

The operation of the compressing device 62, constructed in the manner described above will be described. Picture image information 75 in block units, transferred from the scanner 20 by way of the input interface 60, is encoded and compressed.

Referring to FIG. 6, the picture image information 75 in block units is entered into the block discriminating device 76 and the distributing device 78. The block discriminating device 76 characterizes the degree of density in each block of input picture image information 75. The block discriminating device 76 characterizes each block as a block which has considerable changes in density, a block which has intermediate density distribution, or a block which has a relatively flat density gradient, and transfers the result 77 to the distributing device 78 and the selecting device 82.

The distributing device 78 distributes picture image information 75 in block units to one of the encoders 79, 80 or 81, in accordance with the result 77 from the block discriminating device 76. When the block discriminating device 76 determines that a particular block has considerable changes in density, the block will be distributed to the dual chromatic grade BTC encoder 79. When the block discriminating device 76 determines that a particular block has relatively flat density gradient, the block will be distributed to the 16 chromatic grade BTC encoder 81. When the block discriminating device 76 determines that a particular block has an intermediate density distribution, the block will be distributed to the four chromatic grade BTC encoder 80.

Thereafter, the picture image information 75 which has been distributed to the encoders 79, 80 and 81, will be encoded into the signal 83 in a prescribed chromatic grade by the particular one of the chromatic grade BTC encoders 79, 80 and 81.

As shown in FIG. 8, the picture image information 75 in block units distributed to the dual chromatic grade BTC encoder 79, 80 and 81 is entered into the corresponding quantization level calculator 86. The quantization level calculator 86 calculates, through arithmetic operations, the level of quantization appropriate for each block of the picture image information 75.

In specific terms, the quantization level calculator 86 for the dual chromatic grade BTC encoder 79 determines the maximum level of quantization Q1 and the minimum level of quantization Q2 by arithmetic operations. The quantization level calculator 86 for the four chromatic grade BTC encoder 80 determines the maximum level of quantization Q1 and the minimum level of quantization Q4 by arithmetic operations, and the calculator 86 then finds the level of quantization Q2 and the level of quantization Q3 by dividing the interval between the maximum level of quantization Q1 and the minimum level of quantization Q4 into three equal sections. The quantization level calculator 86 for the 16 chromatic grade BTC encoder 81 determines the maximum level of quantization Q1 and the minimum level of quantization Q16 by arithmetic operations, and then the calculator 86 finds the levels of quantization Q2 through Q15 by dividing the interval between the maximum level of quantization Q1 and the minimum level of quantization Q16 into fifteen equal sections.

The values of the levels of quantization 88 worked out by arithmetic operations by the quantization level calculator 86 are entered into a chromatic gradation information encoder 87 and encoded by the chromatic gradation information encoder 87. Specifically, the average value between the maximum level of quantization Q1 and the minimum level of quantization Q2, Q4, or Q16, is expressed as La while the difference between these two values is expressed as Lb. The values La and Lb are output as the signal 89 obtained by encoding the chromatic gradation information. The chromatic gradation information 89 has 16 bits of total information.

As shown in FIG. 8, the picture image information 75 in the block distributed to the dual chromatic grade BTC encoder 79 is also entered into the quantizer 90. The quantizer 90 quantizes the picture image information 75 in the distributed block, performing the quantizing operation in accordance with the level of quantization 88 quantized by the quantizing level calculator 86. The encoders 79, 80 and 81 quantize the picture image information in two chromatic grades, four chromatic grades, or sixteen chromatic grades. The resolution information 91 quantized will be expressed in one bit, two bits, or four bits for one pixel, respectively.

Therefore, the pixels in each block associated with encoder 79 will be expressed in one bit; the pixels in each block associated with encoder 80 will be expressed in two bits and the pixels in the block associated with encoder 81 will be expressed in four bits.

The resolution information 91 thus quantized by the quantizer 90 is entered into a resolution information selecting device 92. The resolution information selecting device 92 eliminates the visually redundant information from the resolution information 91 in correspondence with the resolution information 91 as quantized by the quantizer 90, and outputs the necessary resolution information.

As shown in FIG. 11 (a), when the picture image information is to be encoded in dual chromatic grades, namely, in a picture image area where with considerable changes in density, the resolution information for all 64 pixels in a block, 8 pixels $\times$ 8 pixels = 64 pixels, is selected. As shown in FIG. 11 (b), when the picture image information is to be encoded in four chromatic grades, namely, in a picture image area with intermediate changes in density, the resolution information is selected in a zigzag lattice pattern having 32 pixels in a block, namely, 8 pixels $\times$ 8 pixels/2 = 32 pixels. As shown in FIG. 11 (c), when the information is to be encoded in 16 chromatic grades, namely, in a picture image area with relatively flat changes in density, the resolution 16 pixels in a block, namely, 8 pixels/2×8 pixels/2=16 pixels.

The amount of information in the resolution information 94 output by the resolution information selecting device 92 will be a number of bits corresponding with the number of pixels in the particular block which is selected by the resolution information selecting device 92. As shown in FIG. 11 (a), when the picture image information is encoded in two chromatic grades, there are 64 bits. As shown in FIG. 11 (b), the number of bits when encoding information in four chromatic grades is 32 bits. As shown in FIG. 11 (c), the number of bits when encoding information in 16 chromatic grades is 16 bits.

The picture image information 83 is encoded by one of the encoders 79, 80, or 81. When output from the dual chromatic grade BTC encoder 79, the encoded picture image information 83 has chromatic gradation information 89 consisting of 8 bits×2=16 bits, and resolution information 95 consisting of 1 bit×64=64 bits. When output from the four chromatic grade BTC encoder 80, the encoded picture image information 83 has chromatic gradation information 89 consisting of 8 bits×2=16 bits and the resolution information 95 consisting of 2 bits×32=64 bits. When output from the 16 chromatic grade BTC encoder 81 the encoded picture image information 83 has chromatic gradation information 89 consisting of 8 bits×2=16 bits and resolution information 95 consisting of 4 bits×16=64 bits.

Therefore, the number of pixels selected in each block multiplied by the number of bits used to express each pixel selected is a constant. Because this value is a constant, the amount of information in each compressed block will be constant.

The picture image information 83 encoded by any of the encoders 79, 80, or 81, is selected by the selecting device 82 in accordance with the result 77 found by the block discriminating device 76, as shown in FIG. 6. The picture image information 83 is output as encoded picture image information 84. The chromatic gradation information and the resolution information are combined in the encoded picture image information 84.

The picture image encoding system in this example always produces encoded picture image information signals having a fixed amount of information, preferably 80 bits. Encoding process can be performed while always allocating a constant amount of information to each block, as shown in FIG. 12, without depending on the result determined by the block discriminating device.

To identify which of the encoders has been selected in the decoding process two bits of block selecting information is added to each block. The encoding efficiency, namely, the ratio of compression, in this example will remain a constant value, preferably, 8×8 pixels×8 bits per pixel/(80 bits+2 bits)=6.244.

The encoded picture image information is decoded by the extending device 69 when the information is read out of the storage device. The decoding process which is executed by the extending device 69 will now be described.

The decoding of the picture image information is performed in block units. The block selection information inserted during the encoding identifies which of the encoders 79, 80, or 81 was selected during the encoding operations. With this information, the chromatic gradation information La and Lb and the resolution information shown in FIG. 9 are decoded.

In this example, the Hufmann or a similar encoding process is not employed. Accordingly, the chromatic gradation information and the resolution information, which are composed of binary numbers arranged in the predetermined sequence and bit length, can be read in the regular sequence. Next, with the chromatic gradation information La and Lb read, the interval from La+Lb/2 to La−Lb/2 is divided into equal sections, and the levels of quantization, Q1, Q2, Q3 . . . Q16, are found by arithmetic operations.

Then, with the levels of quantization, Q1, Q2, Q3, . . . Q16, determined, and the resolution information read into the system, the device reproduces the picture image information.

When all of the pixels in a block are not used, the density of the unselected pixels is reproduced by either estimation or interpolation performed on the basis of the density of the neighboring pixels already reproduced. If the resolution information is in a zigzag lattice pattern or a straight lattice pattern, the pattern is considered when interpolating.

The picture image storing device according to the present invention applied to the digital copying machine described in this example performs the storage and decoding of picture image information as well as copying operations performed on picture image information.

When copying operations are performed on an original document the operator sets the original document 11 in the original document feeding tray 12 of the automatic document feeder 10, and the operator specifies, by operating the keyboard 6 in the UI 5, what type of copying operation should be performed. With a push on the start button, the copying machine starts its copying operations. FIG. 13 is a flow diagram of processing followed by the image processing system according to the preferred embodiment.

The CPU 71 transmits a signal to the automatic document feeder 10 and the automatic document feeder 10 starts feeding the sheets of the original document 11 (step 1302). The CPU 71 detects the size of the original document 11 being transported from the original document feeding tray 12 provided in the automatic document feeder 10 (step 1303). The CPU 71 refers to a table (a look-up table: LUT) stored in the RAM 73, and, on the basis of the size of the original document 11, compresses the picture image information of the original document 11 into a particular size by means of the compressing device 65. The CPU 71 then finds the memory capacity m required to store the compressed picture image information of the original document in the storage device 65 (step 1306).

The picture image storing method employed in the picture image storing device always operates at a constant ratio of compression in processing the picture image information on the original document 11, without any regard to the type of the original document. The value of the ratio of compression is preferably 6.244. Accordingly, the device can determine the amount of information on the original document 11 on the basis of the value of the resolution with which the device reads the original document 11 and the size of the original document 11 and the value for the ratio of compression. The device can then determine the memory capacity required in the storage device 65 for the storage of the compressed picture image information. If the device reads an original document 11 of A4 size at the resolution of 400 dpi as picture image information in eight bits per pixel, then the amount of information per sheet will be approximately 15.5 mega bytes. Hence, the amount of the picture image information m after compression is 15.5÷6.244=2.48 mega bytes.

The CPU 71 checks the available capacity in the storage device 65 through a disk controller 67, and determines whether or not the original document 11 is the initial sheet of the original document (step 1308). If the particular sheet is the initial sheet, the CPU 71 sets the value of Mj at 0 (step 1309). The CPU 71 performs arithmetic operations to add m to the value Mj (step 1312).

The CPU 71 then determines whether the available memory capacity M in the storage device 65 is equal to or greater than the memory capacity m which is necessary for storing the compressed picture image information (step 1314). If the available memory capacity M in the storage device 65 is less than the memory capacity m required for the storage of the compressed picture image information, the CPU 71 issues instructions for suspension of the scanning operation (step 1316), and notifies the operator through the display unit 8 of the UI 5, that the device cannot perform the reading of the original document 11 due to a shortage of available memory capacity M in the storage device 65. The CPU 71 also sets the device in the standby state until the available memory capacity M is increased to not less than the capacity m which is necessary for storing the compressed picture image information (step 1318).

The CPU 71 checks whether available memory capacity M in the storage device 65 increases to a capacity equal to or in excess of the memory capacity m which is required for storing the compressed picture image information (step 1320). When there is sufficient memory, the CPU 71 issues instructions for starting a scanning operation (step 1322), and conducts arithmetic operations to deduct the memory capacity m from the available memory capacity M (step 1324). The CPU 71 also finishes the scanning of the original document 11 (step 1326), which has been transported by the automatic document feeder 10 to the area over the platen 15, and discharges the original document 11 (step 1328).

The CPU 71 repeats the operations described above until the final sheet of the original document 11 has been processed (step 1330). When the final sheet of the original document 11 has been completed, the CPU 71 writes to Mj the value for securing the available capacity M in the storage device 65 Mp (step 1332).

The CPU 71, thus, executes the operations of reading the original document 11, and deciding before the reading operations whether or not it is possible to store the compressed picture image information of the original document 11 read into the system with the scanner 20.

As shown in FIG. 5 the input interface 60 and the multiplexer 61 transfer the picture image information from the original document 11 in regular sequential order to the compressing device 62. The picture information is then compressed by the compressing device 62 at a uniform ratio of compression. The compressed picture image information is stored in regular sequential order in page units in the storage device 65 via the transfer rate conversion buffer 63 and the page buffer 64.

The picture image information of the original document 11 stored in the storage device 65 is transferred to the extending device 69 via the transfer rate conversion buffer 68, and processed by the extending device 69 to reverse the compressing process. The decoded picture image information of the original document 11 is transferred to the IOT 3 via an output interface 70, and the output picture image information is processed by the IOT 3, which performs prescribed picture image recording operations specified by the operator.

When recording the picture image information by the IOT 3 is completed, the CPU 71 confirms the completion of the preceding job (step 1340), and then adds the memory capacity Mp secured in the storage device 65 for the execution of the job to the available memory capacity M in the storage device 65 (step 1346), making it possible to use the available capacity Mp in the storage device 65, which has been used for the preceding job, to the storage of the compressed data for another job.

The picture image storing method and device according to the preferred embodiments operate to determine the characteristics of the picture image information, as divided into blocks, when the device compresses the picture image information and allocate the individual blocks of picture image information to the appropriate individual encoders in accordance with the characteristics of the individual blocks of picture image information.

When the device has found that a given block of picture image information has considerable changes in density, the device selects the encoder 79, which encodes the picture image information in the particular block with a smaller amount of chromatic gradation information but with a larger amount of resolution information. When a given block of picture image information has relatively flat changes in density, the device selects the encoder 81, which encodes the picture image information with a larger amount of chromatic gradation information but with a smaller amount of resolution information. The picture image information in each block is, thereby, compressed to a constant amount of information. The ratio of compression of the picture image information of the original document 11 will always be constant.

The preferred embodiments make it possible to automatically determine the amount of information in the picture image information of the original document after the compression of the picture image information, based upon the size of the original document. Accordingly, the preferred embodiments make it possible to determine in advance, on the basis of the amount of information in the compressed picture image information and the memory capacity remaining in the storage device 65, whether or not it is possible to store in the storage device 65 the compressed picture image information of the original document.

The preferred embodiments of present invention saves the user from the troublesome and complicated operations involved in resetting the original document 11 in the automatic document feeder 10 and resuming the operations for reading the original document 11 when the remaining storage capacity in the storage device 65 is restored after the operations for reading the original document 11 is interrupted because of the occurrence of a shortage of the memory capacity remaining in the storage device 65. The picture image storing method and device according to the present invention do not require the performance of a prescanning operation for measuring the ratio of compression of the picture image information of the original document. It is, therefore, possible to prevent the complication of the control over the copying operations and additionally to prevent a decrease in the number of copies which can be produced in a given unit of time.

As it is possible for the preferred embodiments to determine in advance whether or not it is possible to store in the storage device 65 the compressed picture image information, the concurrence of the processing operations can be secured for picture image information input from various sources.

The present invention is capable of automatically finding the amount of information in the compressed picture image information, using only the size of the original document, allowing the user to easily control the files of the picture image information of the original document 11 stored in the storage device 65.

In compressing the picture image information, the preferred embodiments perform the encoding operation with up to 16 chromatic grades, in accordance with the characteristics of the processed picture image information, when the device processes picture image information which requires highly diversified grades on the scale of chromatic gradation. Therefore, even when the block size is enlarged in order to improve the encoding efficiency in the course of the operations for the compression of the picture image information, the quality of the picture images will not deteriorate because of a shortage in the number of chromatic grades.

When the picture image information of the original document 11 is compressed, the device does not allocate any uniformly high resolution information to all the pixels in a given block, but allocates such increased or decreased resolution information as regulated in accordance with the characteristics of the picture image information in the particular block. Therefore, the device according to the present invention prevents inadvertently redundant information.

Figure 14:
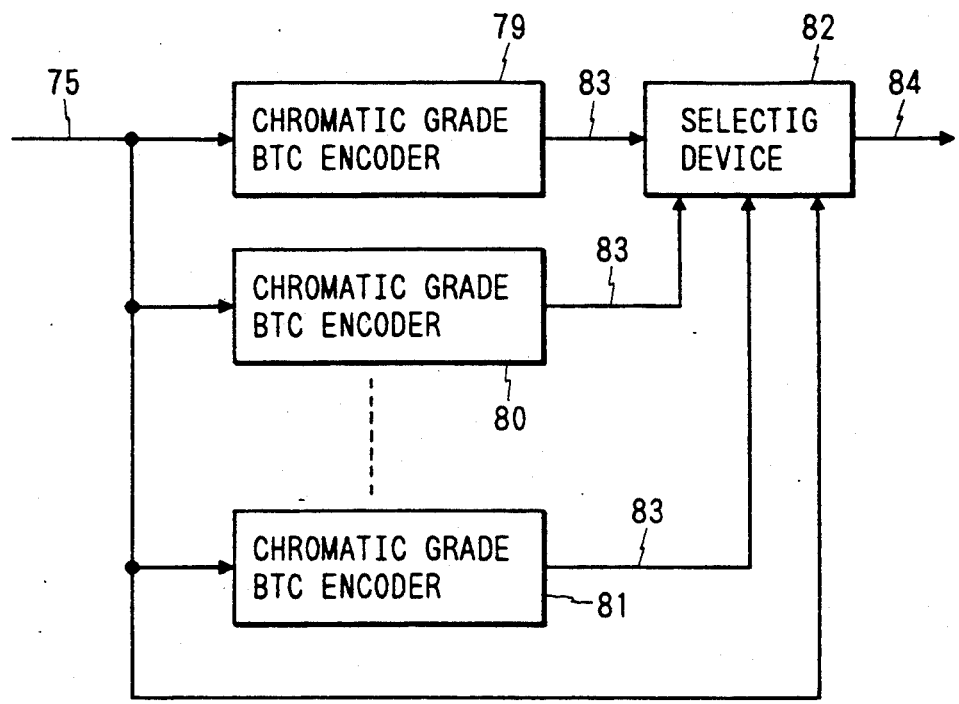
FIG. 14 is a block diagram illustrating the principal parts of a second embodiment of the picture image storing device according to the present invention.
Figure 15:
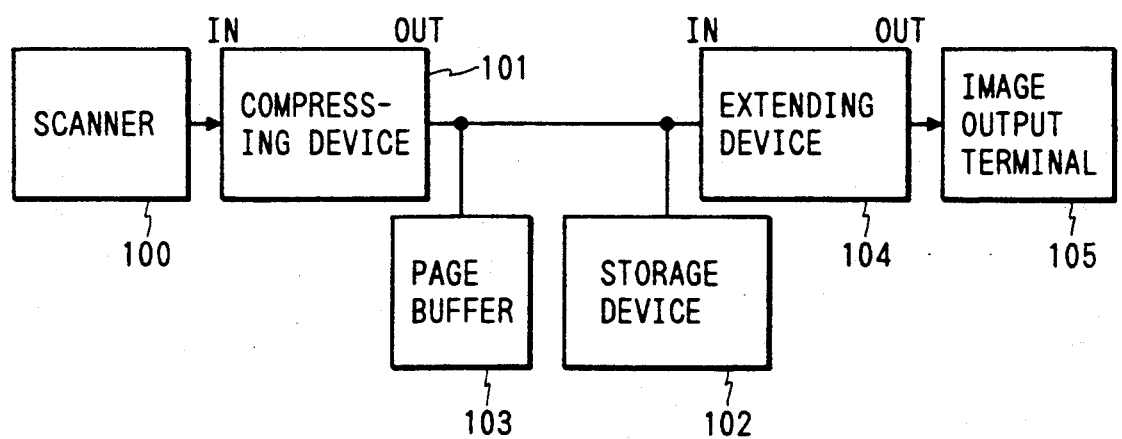
FIG. 15 is a block diagram illustrating a conventional picture image storing device.

FIG. 14 is a block diagram illustrating a second embodiment of the present invention. The second embodiment will be described below with the same reference numbers used to denote the same component parts as those in the first embodiment.

In the second embodiment, the picture image storing device does not allocate the picture image information input in block units to the encoders based upon the characteristics of the picture image information in each block, but simultaneously encodes the picture image information input block by block, using all of a plurality of encoders 79, 80, and 81. A selecting device then selects the picture image information encoded by the respective encoders 79, 80, and 81 to form unified picture image information.

The encoders 79, 80 and 81 are constructed in the same manner as in the preceding example, but a block discriminating device or distributing device is not provided. The selecting device decodes the encoded picture image information, compares the decoded picture image information with the corresponding parts of the picture image information before encoding, selects the encoded picture image information with the least distortion, and outputs the selected picture image information as the encoded information. When this process is performed, the second power error average may be used to determining the distortion, or a cumulative value may be used as such a measure.

In this example, a block discriminating device or a distributing device is not needed.

The other parts of the construction and functions of the picture image storing device in this example are the same as those in the example given earlier, and their description is, therefore, omitted.

The picture image storing method and device according to the preferred embodiments of the present invention are capable of determining in advance whether the picture image information in the original document can be stored in memory. Owing to this advantage, the user can avoid the troublesome and complicated operations of resetting the original document in the device and starting the operations for reading the original document again when the remaining storage capacity is recovered after the operation for reading the original document are interrupted because of a shortage of memory capacity while the original document is being read. The preferred embodiments not require a prescanning operation, and therefore, avoid the complication of the control over the copying operation and can also avoid a decrease in the number of copies which can be produced in a unit of time.

The preferred embodiments determine in advance, without performing any measurement of the ratio of compression, whether the picture image information of the original document intended for its reading can be stored, and, accordingly, the preferred embodiments can secure the concurrent processing capabilities for picture images from a plural number of input sources.

The preferred embodiments automatically determine the amount of information in the picture image information after the compression of the picture image information, given only the size of the original document is known, and will therefore make it possible to easily control the files of the stored picture image information.

The preferred embodiments perform the encoding operation with as many as 16 chromatic grades to picture image information which requires a highly diversified scale of chromatic gradation. Therefore, even if the block size is enlarged to improve the encoding efficiency during data compression, the quality of the picture images will not necessarily deteriorate because of a shortage in the number of chromatic grades.

When the picture image information of the original document is compressed, the device does not allocate uniformly high resolution information to all the blocks, but allocates the resolution information as increased or decreased in accordance with the characteristics of the picture image information in the particular block. Therefore, the preferred embodiments are capable of preventing inadvertently redundant information.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data compression method having a fixed ratio of compression for image data expressed in image pixels having more than one image gradation level, the data compression method comprising the steps of:
- dividing the image data to produce blocks of data;
- characterizing a block of data according to the data within the block;
- encoding a block of data according to the characterization of the block to generate an encoded block, each encoded block having a plurality of encoded pixels having at least one bit of information to express an image gradation level, the encoding step comprising the sub steps of:
  - selecting a number of encoded pixels to express the block; and
  - selecting a number of bits to express the image gradation level of each encoded pixel, the number of bits being inversely proportional to the number of encoded pixels selected to express the block.

2. A data compression method according to claim 1, wherein the step of characterizing a block of data comprises the sub step of sorting the block into a category based upon the density variation of the image pixels comprising the block.

3. A data compression method according to claim 2, wherein the selected number of encoded pixels needed to express the block varies directly with the image gradation variation of the image pixels comprising the block.

4. A data compression method according to claim 3, wherein the data is divided into blocks of data having equal amounts of data.

5. A data compression method according to claim 4, further comprising the step of decoding the encoded blocks.

6. A data compression method according to claim 1, wherein the step of characterizing the block of data comprises the sub steps of:
- encoding the block of data a plurality of times to produce a plurality of encoded blocks;
- evaluating the distortion of each encoded block; and
- characterizing the block of data in accordance with the evaluated distortion.

7. A data compression method having a fixed ratio of compression for image data expressed in image pixels having more than one image gradation level, the data compression method comprising the steps of:
- dividing the data into blocks of data;
- encoding a block of data plurality of times to generate a plurality of encoded blocks, each encoded block having a plurality of encoded pixels having at least one bit of information to express an image gradation level and each encoded block having a different number of encoded pixels, the encoding step comprising the sub steps of:
  - selecting a number of encoded pixels to express the block; and
  - selecting a number of bits to express the image gradation level of each encoded pixel, the number of bits being inversely related to the number of encoded pixels selected to express the block; and
- selecting one of the plurality of encoded blocks, the selected encoded block having the least distortion among the plurality of encoded blocks.

8. A data compression device according to claim 7 wherein the number of bits to express the image gradation level of each encoded pixel is inversely proportional to the number of encoded pixels selected to express the block.

9. A data compression method according to claim 7, wherein the step of selecting one of the plurality of encoded blocks comprises the sub steps of:
- decoding the plurality of encoded blocks; and
- comparing the decoded blocks with the blocks of data to select the encoded block having the least distortion.

10. A data compression device having a fixed ratio of compression for image data expressed in image pixels having more than one image gradation level, the data compression device comprising:
- dividing means for dividing the data into blocks of data;
- characterizing means, responsive to the dividing means, for characterizing a block of data according to the data within the block;
- encoding means, responsive to the dividing means and to the characterizing means, for encoding a block of data according to the characterization of the block to generate a encoded block having a plurality of encoded pixels each having at least one bit of information to express an image gradation level, the encoding means comprising:
  - first selecting means for selecting a number of encoded pixels to express the block; and
  - second selecting means for selecting a number of bits to express the image gradation level of each encoded pixel, the number of bits being inversely proportional to the number of encoded pixels selected to express the block.

11. A data compression device according to claim 10, wherein the characterizing means includes means for sorting each block into a category in accordance with the image gradation of the image pixels comprising the block.

12. A data compression device according to claim 11, wherein the first selecting means includes means for selecting the number of encoded pixels needed to express the block to vary directly with the density variation of the pixels comprising the block.

13. A data compression device according to claim 12, wherein the encoder means further includes a plurality of encoders, the number of encoders equaling the number of categories.

14. A data compression device having a fixed ratio of compression for image data expressed in image pixels having more than one image gradation level, the data compression device comprising:
- dividing means for dividing the data into blocks of data;
- a plurality of encoding means for encoding a block of data a plurality of times to generate a plurality of encoded blocks, each encoded block having a plurality of encoded pixels having at least one bit of information to express an image gradation level and each encoded block having a different number of encoded pixels, each encoding means comprising:
  - first selecting means for selecting a number of encoded pixels to express the block; and
  - second selecting means for selecting a number of bits to express the image gradation level of each encoded pixel, the number of bits being inversely related to the number of encoded pixels selected to express the block; and
- third selecting means for selecting one of the plurality of encoded blocks, the selected encoded block having the least distortion among the plurality of encoded blocks corresponding to each block of data.

15. A data compression device according to claim 14, wherein the step of selecting one of the plurality of encoded blocks comprises the steps of:
decoding the plurality of encoded blocks; and
comparing the decoded blocks with the blocks of data to select the encoded block having the least distortion among the plurality of encoded blocks.

16. A data compression device according to claim 14 wherein the number of bits to express the image gradation level of each encoded pixel is inversely proportional to the number of encoded pixels selected to express the block.

* * * * *